April 24, 1962 M. HILSENRATH 3,031,588

LOW DRIFT TRANSISTORIZED GATING CIRCUIT

Filed Sept. 22, 1959 3 Sheets-Sheet 1

INVENTOR.
MANFRED HILSENRATH
BY George A. Sullivan
Agent

LOW DRIFT TRANSISTORIZED GATING CIRCUIT

Filed Sept. 22, 1959 3 Sheets-Sheet 2

INVENTOR.
MANFRED HILSENRATH
BY George C. Sullivan
Agent

*INVENTOR.*
MANFRED HILSENRATH
*BY* George C. Sullivan
Agent

United States Patent Office 3,031,588

Patented Apr. 24, 1962

3,031,588

LOW DRIFT TRANSISTORIZED GATING CIRCUIT

Manfred Hilsenrath, Los Gatos, Calif., assignor to Lockheed Aircraft Corporation, Burbank, Calif.

Filed Sept. 22, 1959, Ser. No. 841,532
1 Claim. (Cl. 307—88.5)

This invention relates generally to electronic gating circuits, and more particularly to a low-drift transistorized gating circuit.

The gating and amplification of slowly varying, low-level signals has long been a considerable problem in the art, chiefly because the low-level signal is usually obscured by variations in the gating circuit characteristics, or the characteristics of D.-C. amplifiers. Also, it is difficult to gate a low-level signal without introducing harmful amounts of pedestal; that is, a signal in addition to the low-level signal produced by application of the gating pulse.

One type of gating circuit which has been used is of the bridge-type, which employs semiconductor diodes as the bridge elements. A description of such a circuit may be found in "Digital and Pulse Circuits" by Millman and Taub. This diode bridge gating circuit is simple, easily fed, and can be made free from pedestal, but has the major drawback of requiring careful matching of diodes in order to reduce pedestal drift to a small enough value to permit low-level signals to be gated. However, matched diodes is not the whole answer, because the characteristics of diodes do not always change the same throughout any appreciable temperature range. The bridge diode gating circuit, therefore, has never been completely satisfactory for the gating of low-level signals where any significant amount of temperature change is involved. Instead, highly complex circuitry, including special temperature compensating techniques, have been necessary in order to gate or amplify slowly varying low-level signals.

Accordingly, it is the broad object of this invention to provide a simple, compact, and non-critical transistorized gating circuit, which is capable of gating very low-level signals without introducing pedestal or drift into the gated output signal.

Another object of this invention is to provide a gating circuit in accordance with the preceding object, which in addition, draws relatively little power and provides negligible attenuation of the input signal.

A further object of this invention is to provide an improved form of phase splitter and coupling circuits operating in conjunction with the transistorized gating circuit of any or all of the above-mentioned objects.

Still another object is to provide an improved low-drift D.-C. amplifier which is capable of accurately amplifying extremely low-level signals.

Yet another object of this invention is to provide a highly stable, low drift D.-C. voltmeter which is capable of accurately measuring very small D.-C. voltages.

An additional object of this invention is to provide devices in accordance with the above-mentioned objects which are not only simple and compact, but in addition, do not require matching or critical component selection.

The above-mentioned objects are successfully achieved by means of a bridge-type gating circuit which employs the emitter-base and collector-base junctions of two complementary transistors as the bridge elements in place of the semiconductor diodes heretofore employed. The gating circuit is turned "on" by saturating the transistor bases, and turned "off" by applying cut-off signals to the bases. Such a gating circuit has been found to have high stability and low pedestal drift, even in the presence of large changes in temperature.

It is believed that this very low drift is obtained because for saturated operation, the excess minority carrier density at the emitter-base and collector-base junctions of a transistor are essentially the same, and change the same with temperature since both junctions are so close together physically. The voltage across the collector and emitter of each transistor thereby remains constant to a high degree, preventing any appreciable drift from occurring in the bridge gating circuit, without the need for critical selection of components or transistor matching. Thus, the simplicity of the diode bridge gating circuit is essentially maintained, the need for critical selection and matching eliminated, and the drift reduced below that of highly complex devices now required for the same purpose.

In a typical embodiment of a gating circuit in accordance with the invention, two unmatched complementary transistors are connected so that their collector-base and emitter-base junctions serve as the elements of a bridge circuit, the transistors being gated to saturation and cut-off by a phase splitter and coupling networks. Such a transistorized gating circuit has been found to provide the amazingly small amount of drift of only 200 microvolts in the presence of temperature variations as great as 20° to 100° centigrade.

The specific nature of the invention, as well as other objects, uses and advantages thereof, will clearly appear from the following description and from the accompanying drawing in which.

Like number designate like elements throughout the drawing.

Figures 1, 2:
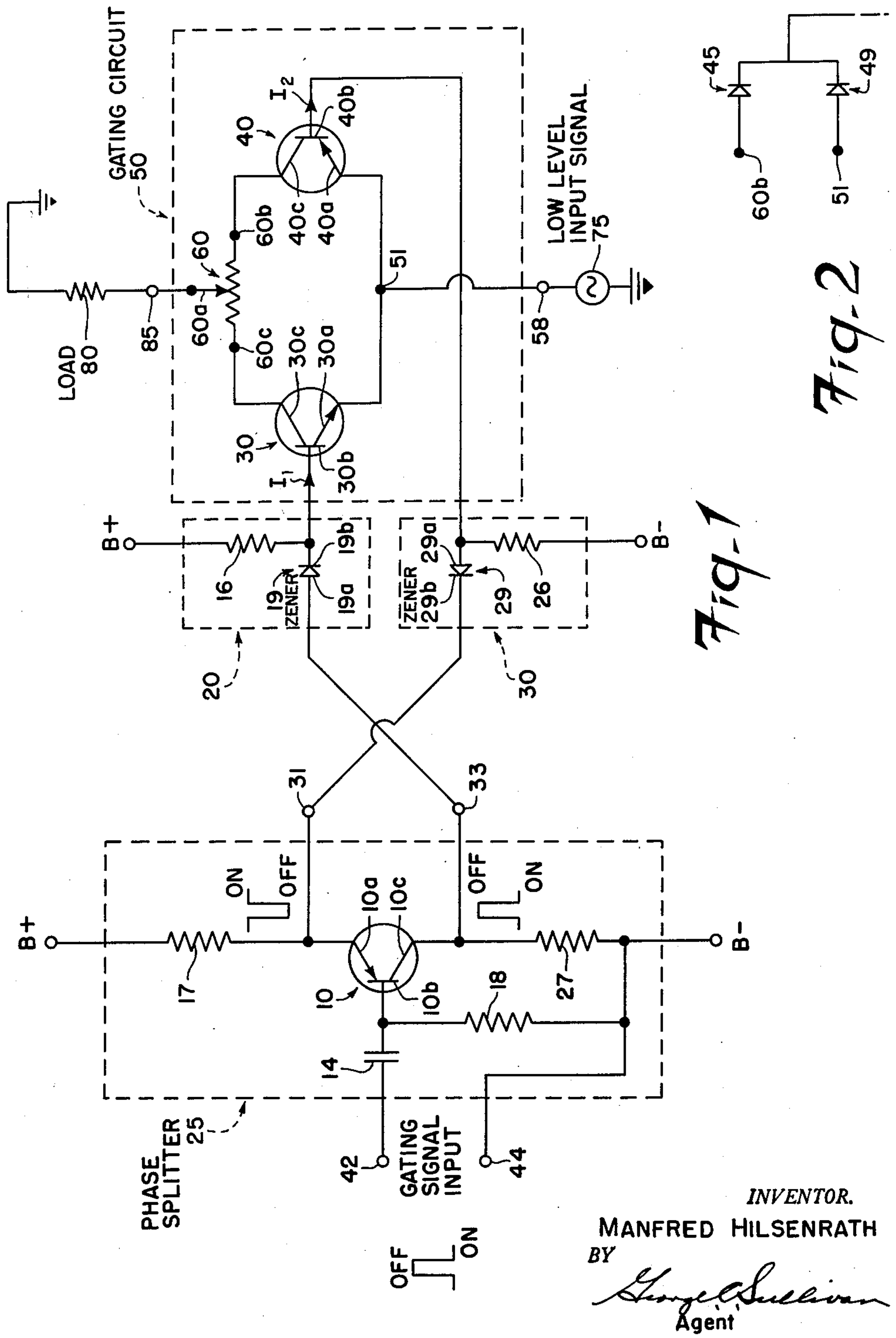
FIGURE 1 is a circuit diagram illustrating a preferred embodiment of the invention.
FIGURE 2 is a circuit diagram of two semiconductor diodes which may be substituted for one of the transistors in FIGURE 1 in a modification of the invention.

In FIGURE 1, two complementary transistors 30 and 40 are connected so that their emitter-base and collector-base junctions form the elements of a bridge-type gating circuit. The transistor 30 is of the NPN type having a "p" region sandwiched between two "n" regions, thereby forming two junctions. The ohmic contact to the "p" region is commonly known as the base and is indicated by 30*b*, while the ohmic contacts to the "n" regions are commonly known as the emitter and collector (depending upon the intended biasing of the junctions), and are indicated at 30*a* and 30*b*, respectively. Conversely, the complementary transistor 40 is of the PNP type having an "n" region sandwiched between two "p" regions, the base being indicated at 40*b*, and the emitter and collector at 40*a* and 40*c*, respectively. As will hereinafter be evident, the designation of which contact is the emitter or collector is not of importance in this invention. However, for the purposes of the description and drawing, a particular designation is chosen, but it is to be understood that the emitter and collector contacts in the circuit may be reversed if so desired. The emitters 30*a* and 40*a* are connected together at a junction 51, while the collectors 30*c* and 40*c* are connected to opposite ends 60*c* and 60*b*, respectively, of a balancing potentiometer 60 having a variable arm 60*a*. A load 80 is connected between the variable arm 60*a* of the potentiometer 60 by means of the terminal 85, and the low-level input signal 75 to be gated is connected between the junction 51 and circuit ground by means of the terminal 58.

The gating circuit 50 is turned "on" by causing saturating currents $I_1$ and $I_2$ to be applied to the bases 30*b* and 40*b*, of the transistors 30 and 40, respectively, thereby permitting the low-level input signal 75 to pass to the load 80 through the paths provided by the effectively shorted transistors 30 and 40. The resistance of the potentiometer 60 is preferably chosen considerably smaller than the resistance of the load 80 to prevent any significant attenuation of the input signal 75. The gating circuit 50 is turned "off" by causing cut-off signals to be applied to the bases 30*b* and 40*b*, the cut-off signal for the base 30*b* being negative, and for the base 40*b*, positive. The high impedance between the collector and emitter of each of the transistors 30 and 40 in the cut-off condition isolates the input signal 75 from the load 80.

When the gating circuit 50 is turned "on" by saturating currents $I_1$ and $I_2$ applied to the bases 30*b* and 40*b*, respectively, it can be seen that the currents $I_1$ and $I_2$ divide between the collector and emitter leads of each transistor. If the currents are not equal and opposite in each lead, a resultant gating current will flow to the load 80 and input signal 75 producing a pedestal. By adjustment of the variable arm 60*a* of the potentiometer 60 any desired pedestal may be produced, including zero pedestal which is necessary in many applications. Although difficult to obtain in many gating circuits, it is evident that the zero pedestal condition is readily obtainable in the gating circuit 50 of FIGURE 1 because of the complementary symmetry arrangement employed. It is to be understood that besides using the potentiometer 60, pedestal adjustment may be obtained in other ways, such as by varying the currents $I_1$ or $I_2$.

If the gating circuit 50 of FIGURE 1 were made up of diodes in place of the emitter-base and collector-base junctions of the transistors 30 and 40, changes in temperature would change the characteristics of the diodes, and unless the diodes were carefully matched so that diode variations cancelled out, the setting of the bridge would change, thereby changing the initially set pedestal appearing in the output. These changes in pedestal are commonly referred to as drift. Since it is practically impossible to match diodes over any appreciable temperature range, slowly varying low-level signals cannot satisfactorily be gated by the diode bridge gating circuit where any significant temperature variations are present. For temperature variations from 20° to 100° centigrade, a carefully matched diode bridge gating circuit is capable of reducing drift only to the order of 2–5 millivolts, which is clearly too much drift for gating a low-level signal.

In the gating circuit 50 of FIGURE 1, however, it has been found that by the use of emitter-base and collector-base junctions of the complementary transistors 30 and 40 in place of the diodes heretofore used, not only is zero pedestal adjustment maintained, but also the amount of drift produced reduces to the order of 200 microvolts over the same 20° to 100° centigrade temperature range, an improvement of 10 to 1 over the conventional diode arrangement. And this is achieved without the need for matching the transistors 30 and 40. As explained previously, the remarkable low drift obtained is believed to result because for saturated base operation, the excess minority carrier density is a function of one and the same minority carrier density of both junctions of a transistor, and is nearly constant throughout the base region. Since the emitter-base and collector-base junctions are in close proximity, the temperature gradient therebetween will be essentially the same, causing the excess minority carrier density to vary equally with temperature at both junctions. The result is that that voltage between the collector and emitter of each transistor will remain substantially constant over a wide temperature range, thereby effectively maintaining the setting of the bridge and reducing the drift appearing in the load 80 to very small proportions.

In addition to the remarkable low drift achieved by the transistorized gating circuit 50 of FIGURE 1, this tansistorized version has other important advantages over its diode counterpart.

In the first place, relatively little gating power is necessary because of the small currents $I_1$ and $I_2$ which are required to cause saturation, as compared to the relatively large forward currents required through the diodes in the diode bridge version. The reduction in gating power achieved is a considerable advantage. Also, the small currents $I_1$ and $I_2$ flowing combined with the complementary symmetry of the transistors insures that the gating current flowing to the input signal 75 will be kept small, which is an important consideration in many applications. Another advantage of the transistorized gating circuit 50 is that because the resistance between the collector and emitter of a saturated transistor is only of the order of one ohm as compared to 100 ohms forward resistance of a typical diode, the attenuation produced by the transistorized gating circuit may be made very much smaller than in the diode version, particularly where the load 80 is a low impedance, such as the input stage of a transistor amplifier.

It will be understood in connection with a bridge-type gating circuit that drift may also result from variations in the power sources, such as the saturating currents $I_1$ and $I_2$ in the gating circuit 50 of FIGURE 1. The provision of stable, drift-free power sources, however, are well within the skill of those in the art, and are not considered within the scope of this invention. The limiting factor in previous gating circuits has been the switching elements and not the power sources. For present purposes, therefore, it will be sufficient to realize that the saturating currents $I_1$ and $I_2$ may readily be supplied to the gating circuit 50 with the necessary stability to maintain the drift appearing in the load 80 at small proportions throughout a wide temperature range.

It should be noted that if the low-level input signal 75 has negligible internal impedance, the junction 51 will remain substantially constant, even with changes in $I_1$ and $I_2$. Also, the constant voltage action of the transistors 30 and 40 will maintain the voltage at the junction 85 constant, thereby producing no drift in the load 80, even though $I_1$ and $I_2$ change. The result is that if the low-level input signal 75 has negligible impedance, not only will the drift produced by the transistors 30 and 40 be very small, but also, drift caused by changes in $I_1$ and $I_2$ will be very small, thus eliminating the need for highly regulated power sources. If the input signal 75 has a high impedance, this effect may still be utilized by first feeding the input signal to a cathode follower having a low output impedance. Of course, the cathode follower will introduce some drift into the signal, so its use should be balanced against the advantages of not needing regulated power sources in the gating circuit.

It will further be understood in connection with the gating circuit 50 that the emitter or collector leads of one or both of the transistors 30 and 40 may be reversed if so desired. This is because a saturated transistor acts as an effective short for both directions of flow therethrough. The drift performance will be essentially the same, since the circuit is dependent upon the voltage across the collector and emitter of each transistor remaining constant, and not on matching the various bridge elements (of course, the potentiometer 60 may have to be readjusted to restore the initial pedestal setting). Because of this constant voltage action, the diodes 45 and 49 shown in FIGURE 2 may respectively be substituted for the collector-base and emitter-base junctions of one of the transistors. The constant voltage action of the remaining transistor will still tend to maintain the bridge setting constant. The drift figure obtained, however, although better than the straight diode arrangement, will not be as good as when both transistors are used, the detrimental effect depending upon how well the diodes 45 and 49 are matched.

By the same token, if even greater reductions in draft are desired than are obtainable by using the unmatched complementary transistors 30 and 40 in the gating circuit 50, matching techniques may be used in conjunction with the constant voltage action produced by the transistors. For example, the transistors 30 and 40 may be matched as to temperature variations, and bilateral transistors (having substantially identical emitter-base and collector-base junctions) may be used.

Although the saturating currents $I_1$ and $I_2$ may be supplied to the gating circuit 50 in a variety of well known ways, a most advantageous arrangement requiring no capacitive coupling (which might introduce distortion) is illustrated in FIGURE 1 employing the phase splitter 25 and the coupling networks 20 and 30. The phase splitter 25 basically consists of a transistor 10 having an emitter 10*a*, a base 10*b* and a collector 10*c*, the emitter 10*a* being connected to a positive voltage source B+ through an emitter resistor 17, and the collector 10*c* being connected to a negative voltage source B− through the collector resistor 27. The gating signal is fed to the base 10*b* of the transistor 10 through the terminals 42 and 44. The capacitor 14 between the base 10*b* and the terminal 42 serves merely as a coupling capacitor, while the resistor 18 between the base 10*b* and B− serves merely as a base resistor. The gating signal fed to the terminals 42 and 44 is preferably a square wave, thereby producing square waves at the terminals 31 and 33 connected to the emitter 10*a* and the collector 10*c*, respectively, which are 180 degrees out of phase with one another.

These 180° out of phase signals are fed to coupling networks 20 and 35 which produce the saturating currents $I_1$ and $I_2$. The coupling network 20 comprises a resistor 26 connected between the base 30*b* of the transistor 30 and the positive voltage source B+, and a diode 19 having its cathode 19*b* connected to the base 30*b* and its plate 19*a* connected to the terminal 33. The coupling network 35, on the other hand, comprises a resistor 16 connected between the base 40*b* of the transistor 40 and the negative voltage source B−, and a diode 29 having its plate 29*a* connected to the base 40*b* and its cathode 29*b* connected to the terminal 31.

The gating signal applied at the terminals 42 and 44 is chosen in conjunction with the reverse breakdown (or zener) voltages of the diodes 19 and 29 and the magnitudes of B+ and B−, so that during the "off" time of the gating signal, a positive voltage is applied to the base 10*b* which drives the emitter 10*a* close enough to B+ to cause zener breakdown of the diode 29, and drives the voltage at the collector 10*c* close enough to B− to cause zener breakdown of the diode 19. The relative values of the resistors 16 and 27 and the resistors 17 and 26 are then chosen so that zener current flow through the diodes 19 and 29 causes a negative cut-off voltage to appear at the base 30*b* of the transistor 30, and a positive cut-off voltage to appear at the base 40*b* of the transistor 40. The transistors 30 and 40 will thus be cut off, preventing the low-level input signal 75 from being passed to the load 80.

During the "on" time of the gating signal, the voltage applied to the base 10*b* of the transistor 10 is reduced by an amount which causes the reverse voltage appearing across each of the diodes 19 and 29 to be less than their zener breakdown voltage; that is, the voltage across each of the diodes 19 and 29 is in the reverse direction, but below the zener breakdown value. For this condition the diodes 19 and 29 act as high impedances, permitting saturating currents $I_1$ and $I_2$ to flow to the bases 30*b* and 40*b* through the resistors 16 and 26, respectively. The resistors 16 and 26 are chosen in conjunction with the power sources B+ and B− to provide the desired values of $I_1$ and $I_2$. When the transistors 30 and 40 are saturated they act essentially as switches, thereby passing the input signal 75 to the load 80. In a typical embodiment of the circuit of FIGURE 1, the following transistor and diode types, and component values are used. It is to be understood that these types and values are presented only for illustrative purposes and are not intended to limit the scope of the invention in any way.

| | |
|---|---|
| Transistor 10 | 2N495 (Philco). |
| Transistor 30 | 2N38 (Texas instruments). |
| Transistor 40 | 2N495 (Philco). |
| Diodes 19 and 29 | Hughes Zener diode SV5. |
| Potentiometer 60 | 50 ohms. |
| Load 80 | 14,000 ohms. |
| Resistors 17 and 27 | 30,000 ohms. |
| Resistors 16 and 26 | 100,000 ohms. |
| Resistor 18 | 3,000,000 ohms. |
| Capacitor 14 | 0.1 microfarad. |
| Positive power source B+ | 12 volts. |
| Negative power source B− | 12 volts. |
| Square wave gating signal | 0–10 volts. |

A circuit constructed with the above-listed components provided gating with an attenuation of only 2%, a noise level of only 50 microvolts, and a drift of less than 200 microvolts over a temperature range from 20° to 100° centigrade.

Figure 3:
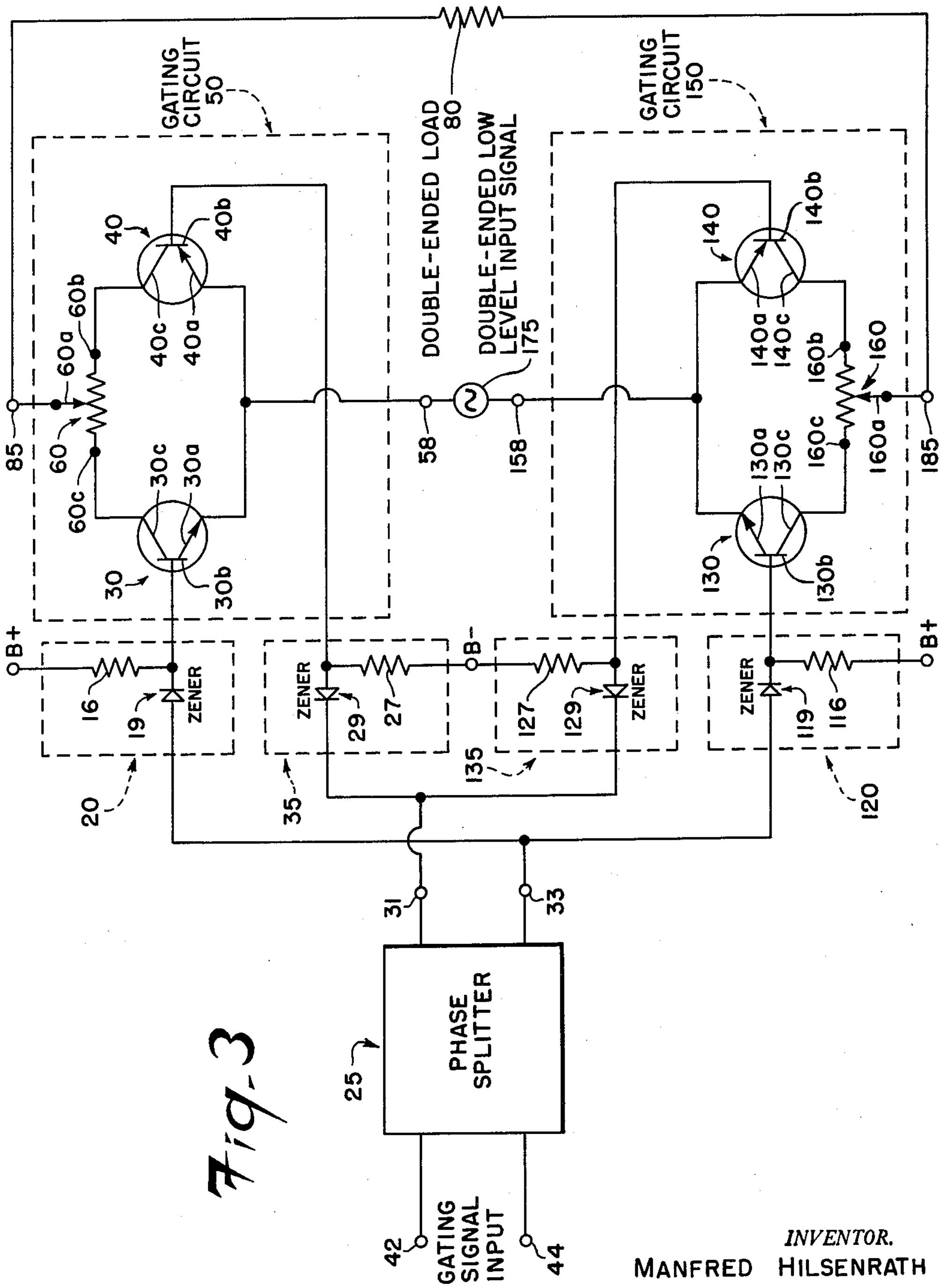
FIGURE 3 is a circuit diagram of a double-ended version of FIGURE 1.

FIGURE 3 is a block and circuit diagram illustrating how an additional gating circuit 150 may be provided in the circuit of FIGURE 1 to permit gating of a double-ended, low-level input signal 175. The transistors 130 and 140 of the gating circuit 150 correspond to the transistors 30 and 40 of the gating circuit 50, the potentiometer 160 corresponds to the potentiometer 60, and the coupling networks 120 and 135 correspond to the coupling networks 20 and 35, respectively. The gating circuit 150 and its corresponding components operate identically to those of the gating circuit 150 but in push-pull relationship therewith so that the double ended signal 175 is switched to the load 80 when the gating circuits 50 and 150 are gated "on." It is to be understood that neither the gating circuits 50 and 150, their corresponding components, nor the coupling circuit components need be matched to provide low drift performance, since each circuit maintains its bridge setting with changes in temperature. However, the double-ended arrangement has the advantage that even further reduction in drift is possible by choosing the gating circuits so that they drift in the same direction with variations in temperature.

Figure 4:
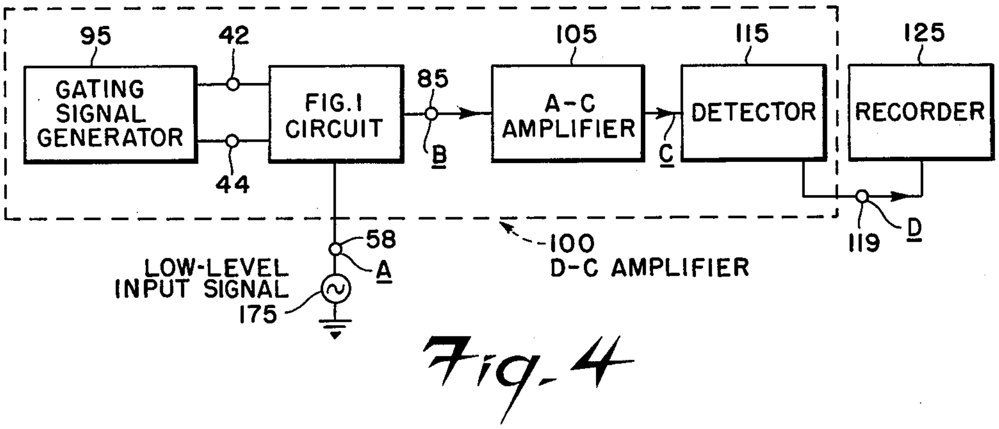
FIGURE 4 is a block diagram of a D.-C. amplifier and recording system incorporating the circuit of FIGURE 1, in accordance with the invention.

FIGURE 4 is a block diagram illustrating how the circuit of FIGURE 1 may be incorporated to provide a D.-C. amplifier 100 which may be used to amplify a slowly varying low-level input signal 175, which may then be fed to a conventional recorder 125. A gating signal generator 95, such as a free-running multivibrator, is used to generate the square wave gating signal which feeds the terminals 42 and 44 of the FIGURE 1 circuit. The low-level input signal 75 to be recorded is fed to the terminal 58. An illustrative low-level input signal which might be present is shown by Graph A in FIGURE 5. The letters, A, B, C and D in FIGURE 5 refer to the signals at correspondingly lettered points in FIGURE 4. The gate action of the FIGURE 1 circuit produces a series of pulses at the terminal 85 as shown at B, the envelope of which follows the variations in amplitude of the low-level input signal 75 shown at A. Since the signal B at terminal 85 is an A.-C. signal, it may readily be amplified by conventional A.-C. amplification techniques, such as indicated by the A.-C. amplifier, whose amplified output is shown at C. The output of the amplifier 105 is now fed to any well-known type of amplitude detector 115 which detects the envelope of the signal C, producing at its output a signal which is the amplified low-level input signal 75 shown at A. This detected amplified low-level input signal is shown at D in FIGURE 5. After amplification this signal may now be fed to a conventional recorder 125, or may be used to drive any other suitable device. Because of the low drift produced by the circuit of FIGURE 1, the D.-C. amplifier 100 incorporating the FIGURE 1 circuit will have remarkably low drift, and this is obtained without the need for matching and without employing complex circuitry. It will be understood that the gating signal generator 95, the A.-C. amplifier 105 and the detector 115, may be transistorized in addition to the FIGURE 1 circuit, thereby making possible an amazingly simple and compact low-drift D.-C. amplifier. The end result, therefore, is that a simple, compact and non-critical D.-C. amplifier can now be built using the present invention, which far out-performs much more complex and critical D.-C. amplifiers presently available.

Figures 5, 6:
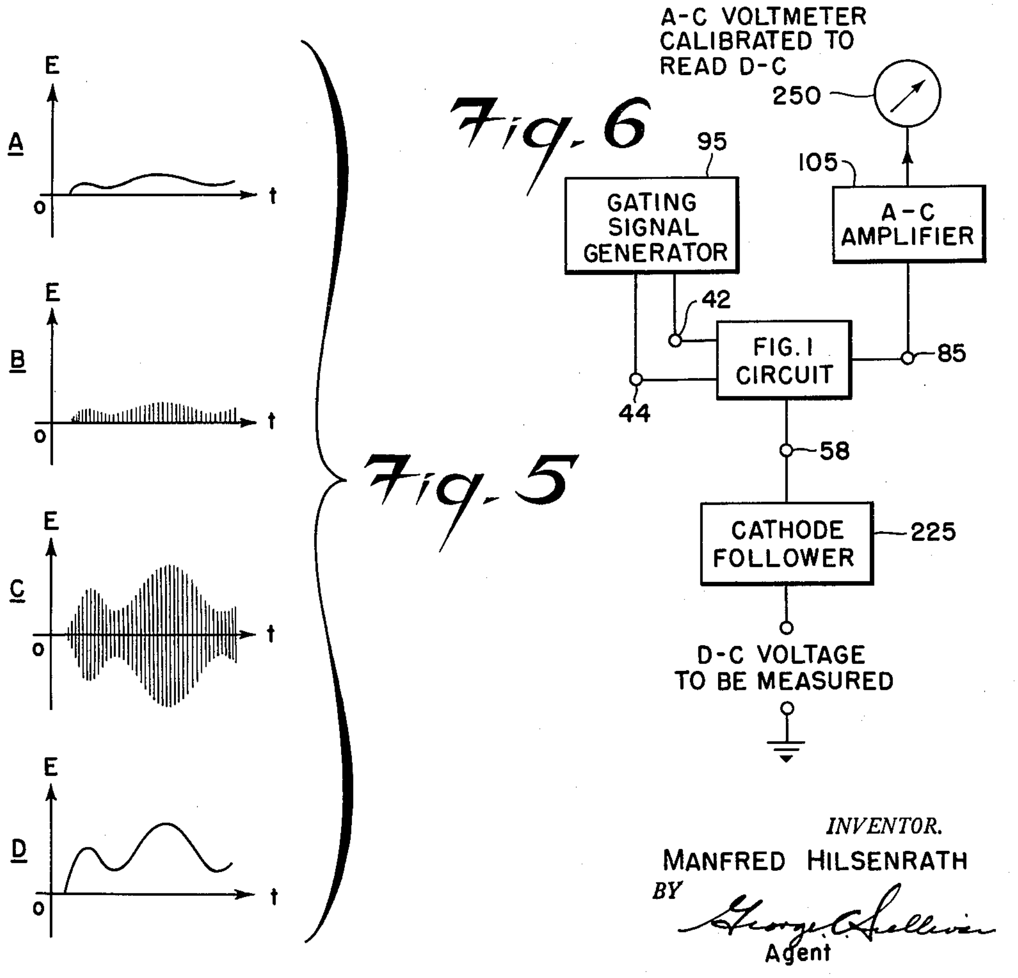
FIGURE 5 are curves illustrating the waveform appearing at various points in FIGURE 4.
FIGURE 6 is a block diagram of a D.-C. voltmeter incorporating the circuit of FIGURE 1, in accordance with the invention.

FIGURE 6 is a block diagram illustrating how the circuit of FIGURE 1 can also be incorporated to provide a low-drift D.-C. voltmeter which is capable of accurately measuring small D.-C. signals. Instead of feeding the output of the A.-C. amplifier 105 to the detector 115, as was done in FIGURE 4, the output of the A.-C. amplifier 105 may be fed directly to an A.-C. voltmeter 250 calibrated to read the D.-C. signal to be measured. In order to provide a high input impedance, the D.-C. signal to be measured is first fed to a low-drift cathode follower 225. Cathode followers with low drift are relatively easy to provide because of their inherent stability. As was the case for the D.-C. amplifier in FIGURE 4, the D.-C. voltmeter of FIGURE 5 is capable of being transistorized, thereby making it possible to provide an accurate low-drift D.-C. voltmeter in amazingly compact and simple form.

It is to be understood that the invention is not limited to the embodiments and applications illustrated in the drawing. The invention may be advantageously employed wherever a low drift pedestal-free gating circuit is required. For example, the invention may be advantageously applied to provide electronic commutation of a large number of channels in connection with telemetering applications.

It will be apparent, therefore, that the embodiments described and shown are only exemplary and that various modifications can be made in construction and arrangement within the scope of the invention as defined in the appended claim.

I claim as my invention:

A gating circuit comprising in combination: first and second complementary transistors, said first transistor being of the NPN type having a "p" region sandwiched between two "n" regions and said second transistor being of the PNP type having an "n" region sandwiched between two "p" regions gating means connected to the "p" region of the NPN transistor and the "n" region of the PNP transistor for simultaneously driving said transistors to saturation to turn the gating circuit "on" and simultaneously driving said transistors to cut-off to turn the gating circuit "off," means connecting an "n" region of said NPN transistor and a "p" region of said PNP transistor to the input signal to be gated, load means to which the gated input signal is to be fed, and means connecting the other "n" region of said NPN transistor and the other "p" region of said PNP transistor to said load means, said gating means comprising a third transistor having a base, an emitter and a cathode, means applying "on" and "off" gating signals to said base, a positive voltage source, a negative voltage source, a first resistance connected between said emitter and said positive voltage source, a second resistance connected between said collector and said positive voltage source, a first semi-conductor diode having its plate connected to said collector and its cathode connected to the "p" region of said NPN transistor, a second semiconductor diode having its cathode connected to said emitter and its plate connected to the "n" region of said PNP transistor, a third resistance connected between said positive voltage source and the cathode of said first diode, and a fourth resistance connected between said negative voltage source and the plate of said second diode, the magnitudes of the "on" and "off" gating signals being chosen in conjunction with the Zener breakdown voltages of said diodes, the magnitudes of said first, second, third and fourth resistances, and the magnitudes of said positive and negative voltage sources so that the "off" gating signal produces voltages at said emitter and collector which break down said diodes resulting in the application of cut-off voltages to the "p" region of said NPN transistor and the "n" region of said PNP transistor, while the "on" gating signal produces signals at said emitter and collector which are in the reverse direction with respect to each diode but less than its Zener breakdown value causing saturating currents to flow to the "p" region of said NPN transistor and the "n" region of said PNP transistor through said third and fourth resistances, respectively.

References Cited in the file of this patent

UNITED STATES PATENTS

| | | |
|---|---|---|
| 2,747,030 | Nuckolls | May 22, 1956 |
| 2,935,623 | Van Overbeek et al. | May 3, 1960 |
| 2,963,656 | Parris | Dec. 6, 1960 |

FOREIGN PATENTS

| | | |
|---|---|---|
| 778,635 | Great Britain | July 10, 1957 |
| 813,307 | Great Britain | May 13, 1959 |

OTHER REFERENCES

Hurley: "Junction Transistor Electronics," John Wiley & Sons, New York, copyright 1958, pages 378–382.